United States Patent
Wang

(10) Patent No.: US 7,714,972 B2
(45) Date of Patent: May 11, 2010

(54) LIQUID CRYSTAL DISPLAY WITH POSITIONAL MARKS FOR BONDING DRIVE IC

(75) Inventor: Yong-Ming Wang, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 475 days.

(21) Appl. No.: 11/601,913

(22) Filed: Nov. 20, 2006

(65) Prior Publication Data
US 2007/0117240 A1   May 24, 2007

(30) Foreign Application Priority Data
Nov. 18, 2005   (CN)   ................................ 094140631

(51) Int. Cl.
*G02F 1/1345*   (2006.01)
(52) U.S. Cl. ........................................ 349/149; 349/152
(58) Field of Classification Search ................. None
See application file for complete search history.

(56) References Cited
U.S. PATENT DOCUMENTS

| | | | |
|---|---|---|---|
| 5,467,210 A | 11/1995 | Kishigami | |
| 5,982,468 A * | 11/1999 | Satou et al. | 349/150 |
| 6,211,935 B1 * | 4/2001 | Yamada | 349/149 |
| 6,556,268 B1 | 4/2003 | Lee et al. | |
| 6,633,361 B1 * | 10/2003 | Fujita | 349/152 |
| 7,012,814 B2 * | 3/2006 | Sugimoto et al. | 361/803 |
| 2003/0062604 A1 * | 4/2003 | Uebayashi et al. | 257/666 |
| 2005/0286005 A1 * | 12/2005 | Watanabe et al. | 349/149 |
| 2006/0146263 A1 * | 7/2006 | Park et al. | 349/149 |

* cited by examiner

*Primary Examiner*—Mike Stahl
(74) *Attorney, Agent, or Firm*—Wei Te Chung

(57) ABSTRACT

An exemplary liquid crystal display (2) includes a liquid crystal panel (20) and a drive integrated circuit (IC) (21). The liquid crystal panel includes a plurality of circuit pads (202), a first positional mark (2031), and a second positional mark (2032). The drive IC includes a plurality of metal bumps (210) respectively electrically connected to the circuit pads of the liquid crystal panel, a first sideline (2131), and a second sideline (2132) oriented at an angle relative to the first sideline. A distance from the first positional mark to a nearest one of the circuit pads is equal to a distance from the first sideline to a nearest one of the metal bumps. A distance from the second positional mark to a nearest one of the circuit pads is equal to a distance from the second sideline to a nearest one of the metal bumps.

19 Claims, 5 Drawing Sheets

US 7,714,972 B2

LIQUID CRYSTAL DISPLAY WITH POSITIONAL MARKS FOR BONDING DRIVE IC

FIELD OF THE INVENTION

The present invention relates to liquid crystal displays (LCDs), and particularly to a liquid crystal display having a liquid crystal panel with positional marks for bonding drive integrated circuits (ICs) thereon.

GENERAL BACKGROUND

With the ongoing development of semiconductor technology, an integrated circuit (IC) has been applied to various kinds of electronic equipment, including a liquid crystal display (LCD). There are three main conventional technologies for bonding an IC onto a liquid crystal panel of an LCD: chip on glass (COG), tape carrier package (TCP), and chip on film (COF).

Referring to FIG. 8, a typical LCD 1 includes a liquid crystal panel 10, and a plurality of drive ICs 11. The liquid crystal panel 10 has a plurality of wires 101. Ends of the wires 101 are gathered at a plurality of bonding regions 100, which are defined at two sides of a periphery of the liquid crystal panel 10. The drive ICs 11 are bonded on the bonding areas 100 of the liquid crystal panel 10, and are electrically connected to the ends of the wires 101.

Referring also to FIG. 9, the wires 101 are strip-shaped metal layers formed on the liquid crystal panel 10. Each of the wires 101 includes a circuit pad 102, which is formed at the end of the wire 101 and disposed in the corresponding bonding region 100.

Referring also to FIG. 10, each drive IC 11 includes a plurality of metal bumps 110 formed on a bottom surface thereof. The metal bumps 110 are made from gold or lead, and are electrically connected to the circuit pads 102 of the wires 101 so as to electrically connect the drive IC 11 and the wires 101. An anisotropic conductive film (ACF) 13 is used to bond the drive IC 11 onto the corresponding bonding region 100 of the liquid crystal panel 10.

With increased precision of manufacturing of the wires 101, a pitch between any two adjacent wires 101 can be reduced. However, when the drive IC 11 is bonded onto the bonding region 100 of the liquid crystal panel 10, there is a risk of bonding deviation as between the metal bumps 110 of the drive IC 11 and the circuit pads 102 of the wires 101. If bonding deviation occurs, this may cause short circuits, which in turn means that the electrical performance of the LCD 1 is likely to be impaired. Therefore when the drive ICs 11 are bonded onto the bonding regions 100, accurate positioning is necessary. Typically, precision apparatuses and accurate operation of the apparatuses are needed. Thus the cost of fabricating the LCD 1 may be unduly high.

Therefore, a new liquid crystal display that can overcome the above-described problems is desired.

SUMMARY

In one preferred embodiment, a liquid crystal display includes a liquid crystal panel and a drive integrated circuit (IC). The liquid crystal panel includes a plurality of circuit pads, a first positional mark, and a second positional mark. The drive IC includes a plurality of metal bumps respectively electrically connected to the circuit pads of the liquid crystal panel, a first sideline, and a second sideline oriented at an angle relative to the first sideline. A distance from the first positional mark to a nearest one of the circuit pads is equal to a distance from the first sideline to a nearest one of the metal bumps. A distance from the second positional mark to a nearest one of the circuit pads is equal to a distance from the second sideline to a nearest one of the metal bumps.

Other advantages and novel features will become more apparent from the following detailed description when taken in conjunction with the accompanying drawings.

DETAILED DESCRIPTION OF PREFERRED EMBODIMENTS

Figure 1:
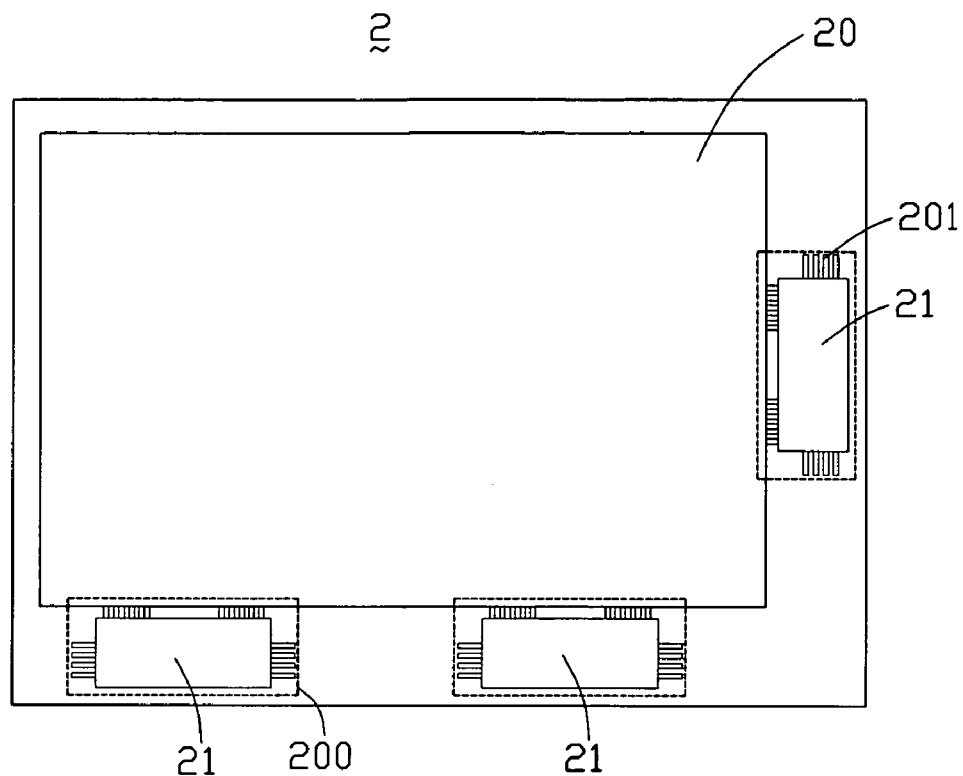
FIG. 1 is a schematic, top plan view of a liquid crystal display according to a first embodiment of the present invention, the liquid crystal display including a liquid crystal panel, the liquid crystal panel including a plurality of bonding regions and a plurality of wires.

Referring to FIG. 1, a liquid crystal display (LCD) 2 according to a first embodiment of the present invention is shown. The LCD 2 includes a liquid crystal panel 20, and three drive integrated circuits (ICs) 21. The liquid crystal panel 20 includes a plurality of bonding regions 200 and a plurality of wires 201. The bonding regions 200 are defined at two sides of a periphery of the liquid crystal panel 20. The drive ICs 21 are bonded on the bonding regions 200, and are electrically connected to the wires 201. The drive ICs 21 are used to drive the liquid crystal panel 20.

Figure 2:
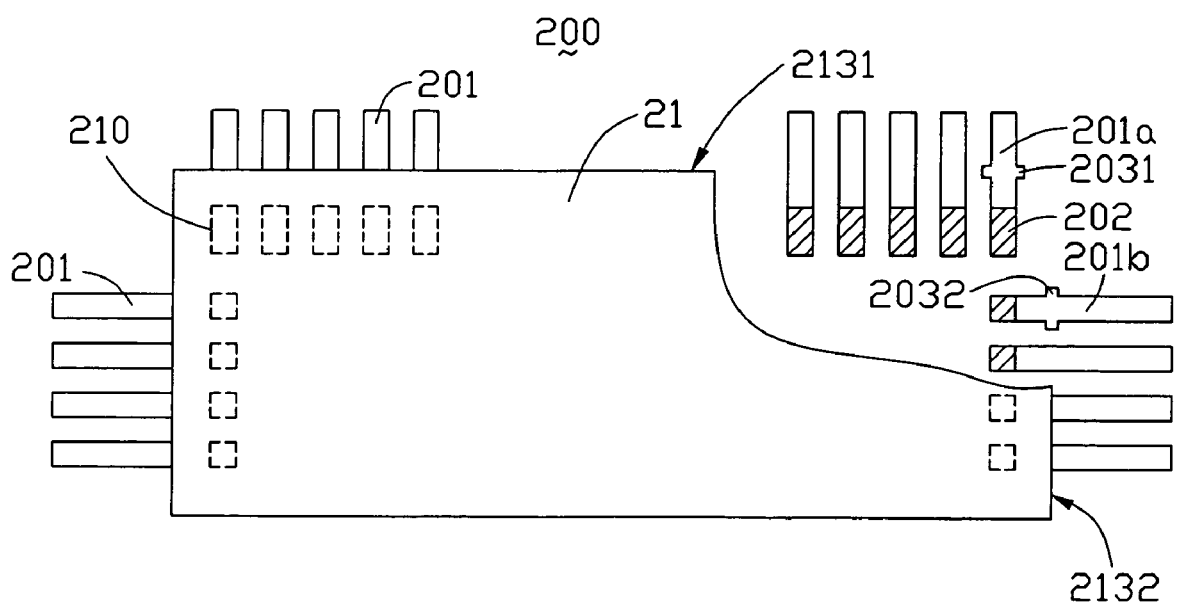
FIG. 2 is an enlarged, cutaway view of one of the bonding regions of the liquid crystal display of FIG. 1, the bonding region having a plurality of ends of certain of the wires therein.

Referring also to FIG. 2, the wires 201 are strip-shaped, and can be made from metal such as aluminum or copper. An end of each of the wires 201 includes a circuit pad 202, which is located in the corresponding bonding region 200.

A first one of the wires 201a extends in a vertical direction (as viewed in FIG. 2), and is adjacent to a corner of the bonding region 200. The first wire 201a includes a horizontal positional mark 2031. A second one of the wires 201b extends in a horizontal direction (as viewed in FIG. 2), and is adjacent to the same corner of the bonding region 200. The second wire 201b includes a vertical positional mark 2032. The positional marks 2031, 2032 are integrally formed as parts of the respective wires 201a, 201b, and are aligned with horizontal and vertical sidelines 2131, 2132 of the drive IC 21 respectively.

Figure 3:
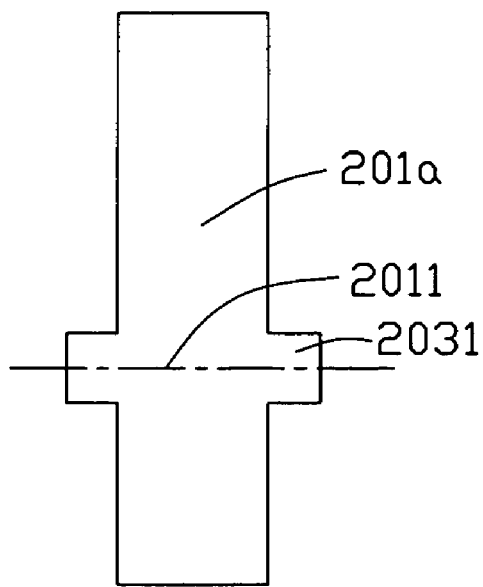
FIG. 3 is an enlarged view of part of the end of one of the wires of FIG. 2, the end of the wire including a horizontal positional mark.

Referring also to FIG. 3, the horizontal and vertical positional marks 2031, 2032 are generally rectangular. A shortest width of each of the horizontal and vertical positional marks 2031, 2032 is in the range from 1~2 μm. A midline 2011 of the horizontal positional mark 2031 coincides with the horizontal sideline 2131 of the drive IC 21. Similarly, a midline (not shown) of the vertical positional mark 2032 coincides with the vertical sideline 2132 of the drive IC 21. The midlines 2011, (not labeled) are reference lines defined herein for the purposes of illustrating the first embodiment, and do not constitute physical parts of the first embodiment. However, in an alternative embodiment, lines equivalent to the midlines 2011, (not labeled) can be marked on the horizontal and vertical positional marks 2031, 2032 respectively.

Each drive IC 21 includes a plurality of metal bumps 210 formed on a bottom surface thereof. The metal bumps 210 are made from gold or lead, and are respectively connected to the circuit pads 202 of the wires 201 so as to electrically connect the drive IC 21 and the wires 201. A vertical distance (as viewed in FIG. 2) from a top row of the metal bumps 210 to the horizontal sideline 2131 of the drive IC 21 is equal to a vertical distance from the circuit pad 202 to the midline 2011 of the horizontal positional mark 2031 of the first wire 201a. A horizontal distance (as viewed in FIG. 2) from a right column of the metal bumps 210 to the vertical sideline 2132 of the drive IC 21 is equal to a horizontal distance from the circuit pad 202 to the midline (not labeled) of the vertical positional mark 2032 of the second wire 201b.

When each drive IC 21 is bonded onto the corresponding bonding region 200 of the liquid crystal panel 20, the horizontal positional mark 2031 of the first wire 201a is aligned with the horizontal sideline 2131 of the drive IC 21, and the vertical positional mark 2032 of the second wire 201b is aligned with the vertical sideline 2132 of the drive IC 21. Then the metal bumps 210 of the drive IC 21 are mechanically and electrically connected to the circuit pads 202 of the wires 201, respectively. Such process can, for example, be by way of hot-pressing.

Generally, when each drive IC 21 is bonded onto the corresponding bonding region 200 of the liquid crystal panel 20, a permissible deviation threshold is less than 2 μm. That is, if deviation as between the drive IC 21 and the wires 201 is less than 2 μm, then short circuits do not occur. The LCD 2 includes the horizontal and vertical positional marks 2031, 2032, which cooperate with the sidelines 2131, 2132 of the drive ICs 21 to precisely position the drive ICs 21. In each bonding region 200, the shortest width of each of the positional marks 2031, 2032 is in the range from 1~2 μm. In general, even if deviation occurs, the deviation is likely to be less than half of the shortest width of the respective positional mark 2031, 2032. That is, the deviation is likely to be less than 1~2 μm, whereby short circuits do not occur. In addition, it is relatively simple and inexpensive to form the positional marks 2031, 2032 as part of the first and second wires 201a, 201b. Therefore the LCD 2 can be mass manufactured with an improved yield and without the need for expensive and troublesome precision apparatuses. That is, the LCD 2 can be mass manufactured at a lower cost.

In the process of assembling the LCD 2, an anisotropic conductive film (ACF) (not shown) can be used to bond each of the drive ICs 21 onto the corresponding bonding regions 200 of the liquid crystal panel 20.

Figure 4:
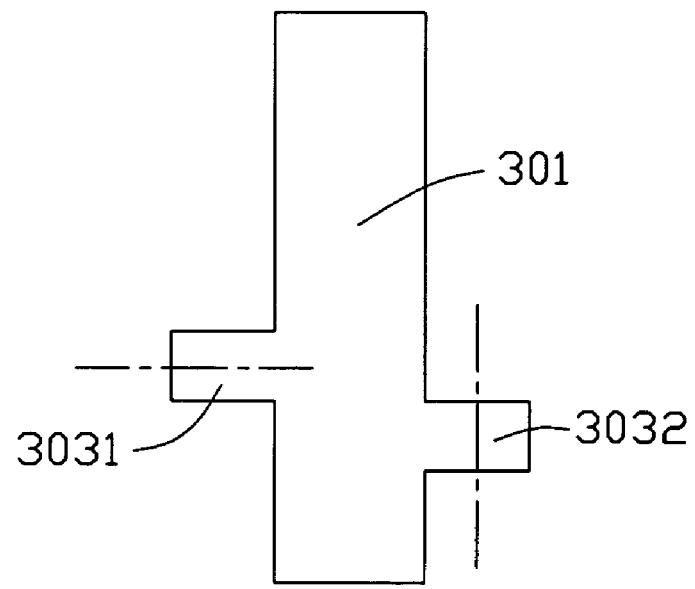
FIG. 4 is similar to FIG. 3, but showing a corresponding view in the case of part of an end of one wire of a liquid crystal display according to a second embodiment of the present invention, the end of the wire including a horizontal positional mark and a vertical positional mark.

Referring to FIG. 4, in a second embodiment of the present invention, a horizontal positional mark 3031 and a vertical positional mark 3032 are provided as part of a same single wire 301.

Figure 5:
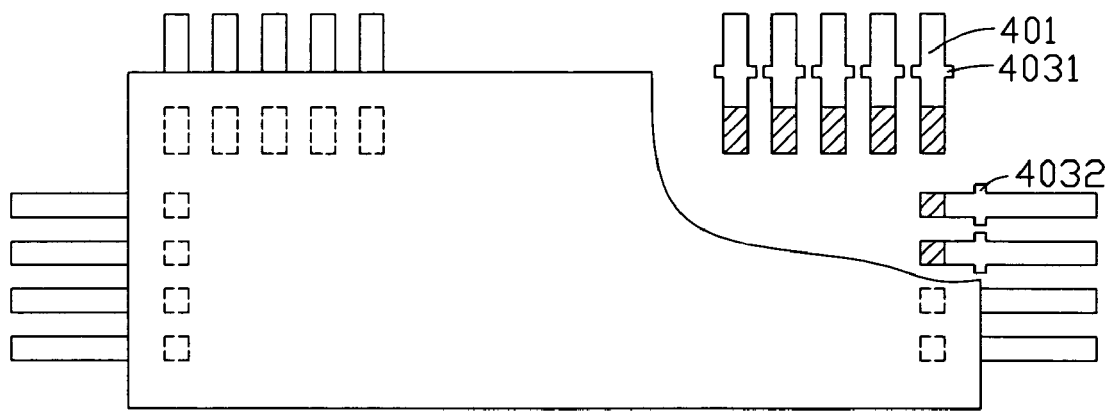
FIG. 5 is a cutaway, top plan view of one of bonding regions of a liquid crystal display according to a third embodiment of the present invention.

Referring to FIG. 5, in a third embodiment of the present invention, a plurality of horizontal positional marks 4031 and a plurality of vertical positional marks 4032 are provided as parts of a plurality of wires 401, respectively.

Figure 6:
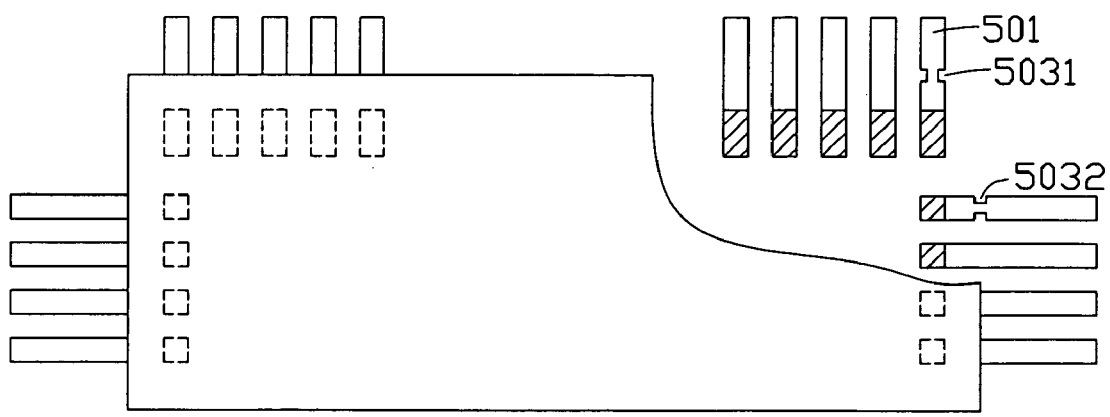
FIG. 6 is a cutaway, top plan view of one of bonding regions of a liquid crystal display according to a fourth embodiment of the present invention.

Referring to FIG. 6, this shows one of bonding regions of a liquid crystal display according to a fourth embodiment of the present invention. Each of two positional marks 5031, 5032 is provided in the form of a pair of opposite recesses respectively defined in lateral side portions of an end of a corresponding wire 501. Each of the recesses is rectangular. The recesses can be formed by etching performs of the wires 501.

Figure 7:
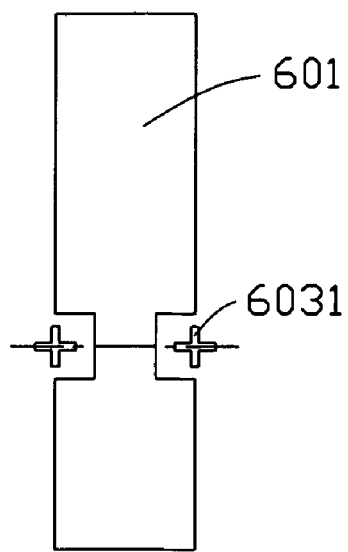
FIG. 7 is similar to FIG. 3, but showing a corresponding view in the case of part of an end of one wire of a liquid crystal display according to a fifth embodiment of the present invention, showing two horizontal positional marks located in recesses in the end of the wire.
Figure 8:
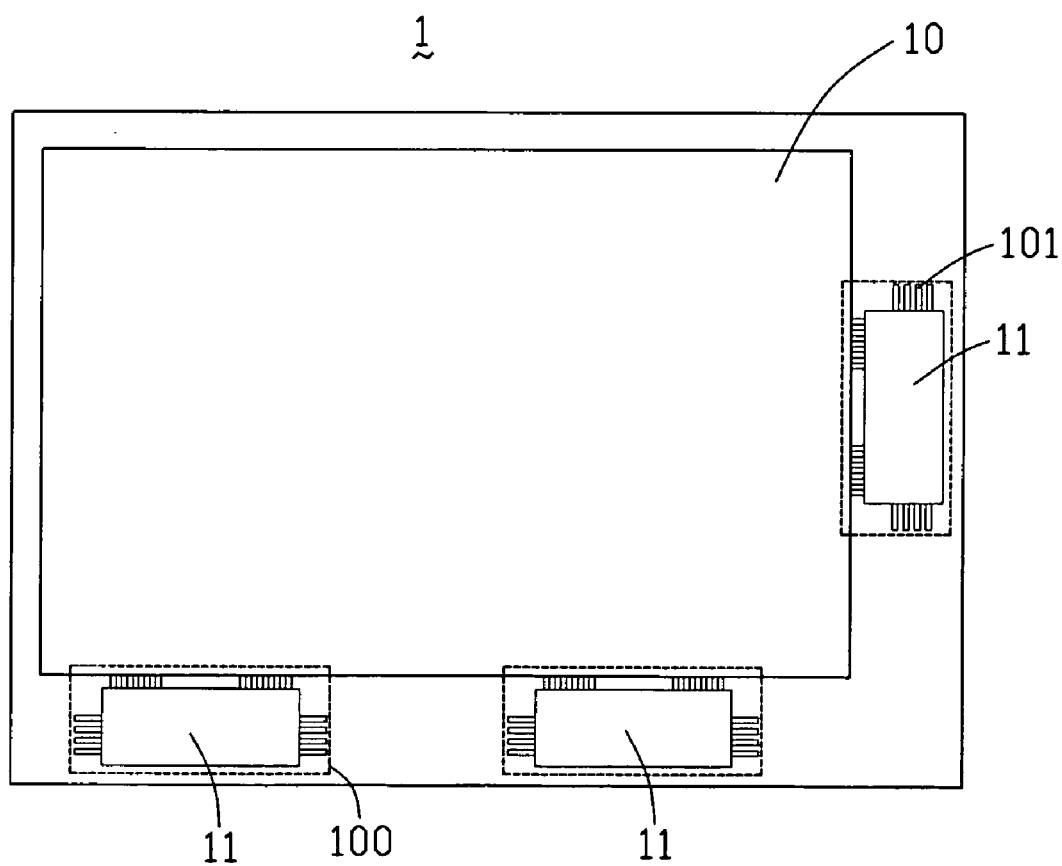
FIG. 8 is a schematic, top plan view of a conventional liquid crystal display, the liquid crystal display including a liquid crystal panel, the liquid crystal panel including a plurality of bonding regions and a plurality of wires.
Figure 9:
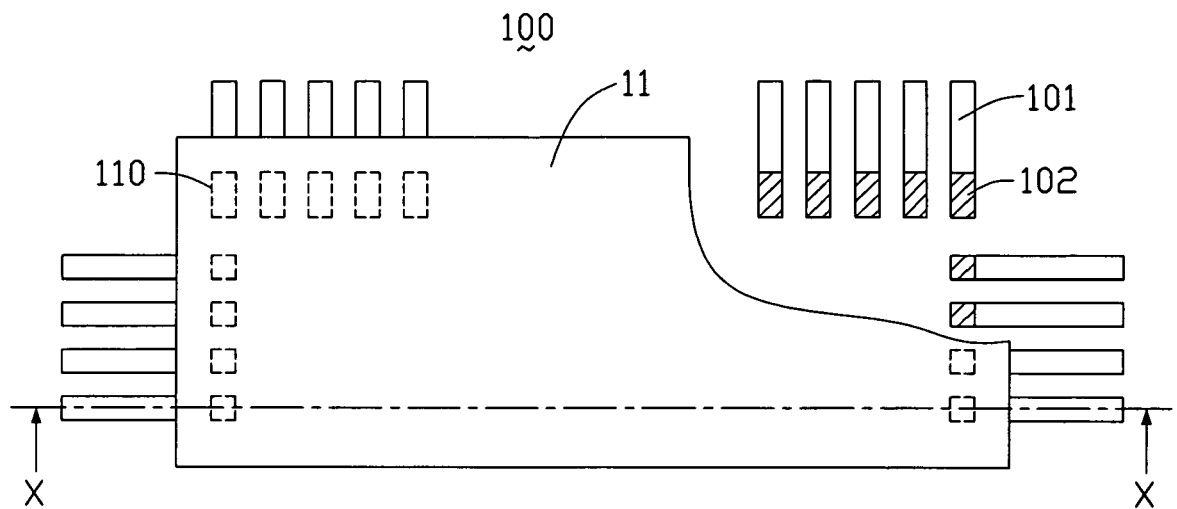
FIG. 9 is an enlarged, cutaway view of one of the bonding regions of the liquid crystal display of FIG. 8.
Figure 10:
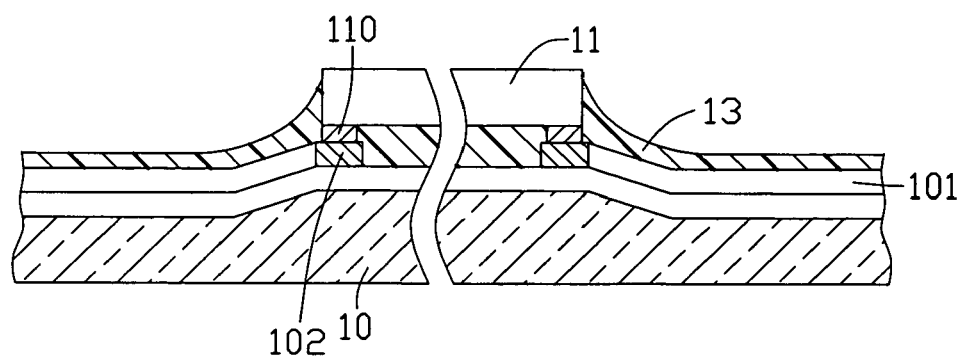
FIG. 10 is an enlarged, abbreviated, cross-sectional view corresponding to line X-X of FIG. 9.

Referring to FIG. 7, this shows part of an end of one wire 601 of a liquid crystal display according to a fifth embodiment of the present invention. The wire 601 has two horizontal positional marks 6031 provided thereat. The horizontal positional marks 6031 are cross-shaped, and are located substantially in a pair of opposite recesses (not labeled) respectively defined in lateral side portions of the end of the wire 601. The horizontal positional marks 6031 can be made from metal such as aluminum or copper. The horizontal positional marks 6031 can for example be formed by way of etching a preform of the wire 601.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display (LCD) comprising:
   a liquid crystal panel comprising a plurality of circuit pads, a first positional mark, and a second positional mark; and
   a drive integrated circuit (IC) comprising a plurality of metal bumps respectively electrically connected to the circuit pads of the liquid crystal panel, a first sideline, and a second sideline substantially perpendicular to the first sideline;
   wherein a distance from the first positional mark to a nearest one of the circuit pads is equal to a distance from the first sideline to a nearest one of the metal bumps, and a distance from the second positional mark to a nearest one of the circuit pads is equal to a distance from the second sideline to a nearest one of the metal bumps.

2. The liquid crystal display as claimed in claim 1, wherein a midline of the first positional mark substantially coincides with the first sideline of the drive IC.

3. The liquid crystal display as claimed in claim 1, wherein a midline of the second positional mark substantially coincides with the second sideline of the drive IC.

4. The liquid crystal display as claimed in claim 1, wherein the liquid crystal panel further comprises a plurality of wires.

5. The liquid crystal display as claimed in claim 4, wherein the circuit pads are provided at ends of the wires, respectively.

6. The liquid crystal display as claimed in claim 4, wherein the first and second positional marks are provided at a same one of the wires.

7. The liquid crystal display as claimed in claim 6, wherein each of the first and second positional marks is a portion of the wire.

8. The liquid crystal display as claimed in claim 4, wherein the first and second positional marks are provided at two of the wires, respectively.

9. The liquid crystal display as claimed in claim 8, wherein each of the first and second positional marks is a portion of the respective wire.

10. The liquid crystal display as claimed in claim 1, wherein the first and second positional marks are generally rectangular.

11. The liquid crystal display as claimed in claim 10, wherein a smallest width of each of the first and second positional marks is in the range from 1~2 µm.

12. The liquid crystal display as claimed in claim 1, wherein the liquid crystal panel further comprises a plurality of wires, the first positional mark is provided in the form of a pair of opposite recesses respectively defined in lateral side portions of an end of one of the wires, and the second positional mark is provided in the form of a pair of opposite recesses respectively defined in lateral side portions of an end of another of the wires.

13. The liquid crystal display as claimed in claim 1, wherein the liquid crystal panel further comprises a plurality of wires, each of two of the wires includes a pair of opposite recesses respectively defined in lateral side portions of an end thereof, the first positional mark is provided in the form of a pair of crosses respectively located at least partly in the recesses of a first one of said two of the wires, and the second positional mark is provided in the form of a pair of crosses respectively located at least partly in the recesses of a second one of said two of the wires.

14. The liquid crystal display as claimed in claim 13, wherein the crosses of the first positional mark are located substantially in the recesses of the first wire, and the crosses of the second positional mark are located substantially in the recesses of the second wire.

15. The liquid crystal display as claimed in claim 1, wherein the liquid crystal panel further comprises a bonding region defined at a periphery thereof, and the circuit pads, the first positional mark, and the second positional mark are located in or around the bonding region.

16. The liquid crystal display as claimed in claim 15, wherein the drive IC is bonded to the bonding region of the liquid crystal panel by an anisotropic conductive film.

17. The liquid crystal display as claimed in claim 1, wherein the metal bumps are made from gold or lead.

18. A liquid crystal display (LCD) comprising:
a liquid crystal panel comprising a plurality of circuit pads, a horizontal positional mark, and a vertical positional mark; and
a drive integrated circuit (IC) comprising a plurality of metal bumps respectively electrically connected to the circuit pads of the liquid crystal panel, a horizontal boundary, and a vertical boundary, a midline of the horizontal positional mark substantially coinciding with the horizontal boundary of the drive IC, a midline of the vertical positional mark substantially coinciding with the vertical boundary of the drive IC;
wherein a distance separating the horizontal positional mark and a nearest one of the circuit pads is equal to a distance separating the horizontal boundary and a nearest one of the metal bumps, and a distance separating the vertical positional mark and a nearest one of the circuit pads is equal to a distance separating the vertical boundary and a nearest one of the metal bumps.

19. A liquid crystal display (LCD) comprising:
a liquid crystal panel comprising a plurality of wires each defining a corresponding circuit pad at a front end and with a constant width except a width varied section behind the circuit pad; and
a drive integrated circuit (IC) defining a boundary and comprising a plurality of metal bumps formed on one surface thereof commonly with a first distance spaced from an edge of said boundary; wherein
a midline of the width varied section substantially coincides with the edge of said boundary.

* * * * *